United States Patent
Khan

(10) Patent No.: US 8,036,677 B2
(45) Date of Patent: Oct. 11, 2011

(54) SYSTEM AND METHOD FOR LOCATING A PHONE USER

(75) Inventor: Sameer Khan, Margao (IN)

(73) Assignee: Kyocera Corporation, Kyoto (JP)

( * ) Notice: Subject to any disclaimer, the term of this patent is extended or adjusted under 35 U.S.C. 154(b) by 694 days.

(21) Appl. No.: 11/344,726

(22) Filed: Jan. 31, 2006

(65) Prior Publication Data

US 2007/0178915 A1    Aug. 2, 2007

(51) Int. Cl.
*H04W 24/00* (2009.01)

(52) U.S. Cl. .................. 455/456.1; 455/412.1; 455/418; 455/457; 455/466

(58) Field of Classification Search .................. 455/418, 455/412.1, 466, 457, 456.1, 410
See application file for complete search history.

(56) References Cited

U.S. PATENT DOCUMENTS

| | | | |
|---|---|---|---|
| 7,218,938 B1* | 5/2007 | Lau et al. ................... | 455/456.1 |
| 2002/0042277 A1 | 4/2002 | Smith | |
| 2002/0045456 A1 | 4/2002 | Obradovich | |
| 2002/0127997 A1* | 9/2002 | Karlstedt et al. ............. | 455/412 |
| 2004/0203901 A1* | 10/2004 | Wilson et al. ............. | 455/414.1 |
| 2004/0203923 A1* | 10/2004 | Mullen ...................... | 455/456.1 |
| 2004/0219932 A1* | 11/2004 | Verteuil .................... | 455/456.2 |
| 2005/0113123 A1* | 5/2005 | Torvinen ..................... | 455/519 |
| 2005/0114021 A1 | 5/2005 | Krull et al. | |
| 2005/0250519 A1* | 11/2005 | Samuel ...................... | 455/457 |
| 2005/0288036 A1 | 12/2005 | Brewer et al. | |
| 2006/0053378 A1* | 3/2006 | Fano et al. .................. | 715/747 |
| 2006/0135142 A1* | 6/2006 | Repka ......................... | 455/418 |
| 2006/0270421 A1* | 11/2006 | Phillips et al. ............. | 455/457 |
| 2007/0004426 A1* | 1/2007 | Pfleging et al. ........... | 455/456.1 |
| 2007/0150444 A1* | 6/2007 | Chesnais et al. ............... | 707/3 |
| 2008/0194275 A1* | 8/2008 | Koch et al. ................. | 455/457 |
| 2008/0227473 A1* | 9/2008 | Haney ........................ | 455/457 |

FOREIGN PATENT DOCUMENTS

WO      WO 02/48836 A       6/2002
WO      WO 2004/104789 A    12/2004

* cited by examiner

*Primary Examiner* — Wayne Cai
*Assistant Examiner* — Julio Perez

(57) ABSTRACT

Systems and methods for locating a user of a wired or wireless communication device allow a communication device to respond to a location request with its current location or a default location. A request for the location of a target wireless communication device is sent to the network where the request is responded to by the network or forwarded to the target device. When the request is received by the target device, the device can deny the location request or respond to the location request with the actual location of the device (as determined by GPS or the network) or with a default, predetermined location. The type of response (denial, actual location, or default location) can be selected by the user of the target device on a granular, per request basis so that the user of the target device can selectively respond to location requests in an appropriate fashion.

21 Claims, 6 Drawing Sheets

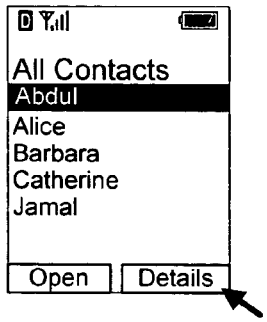
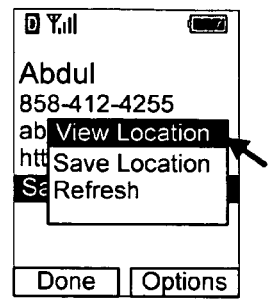
FIG. 3          FIG. 4          FIG. 5
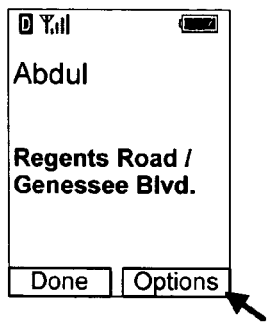
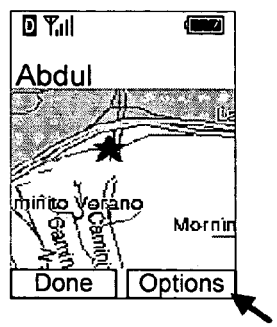
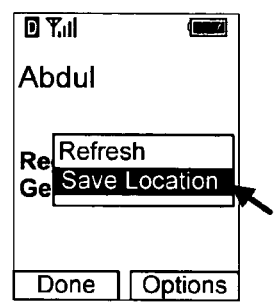
FIG. 6A          FIG. 6B          FIG. 7
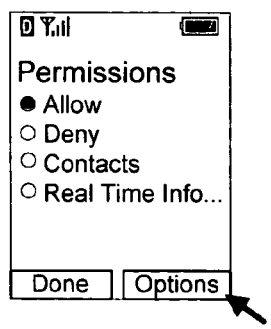
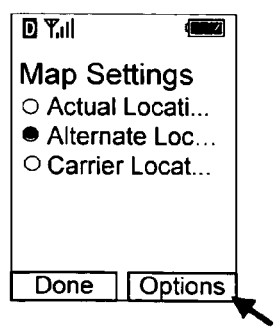
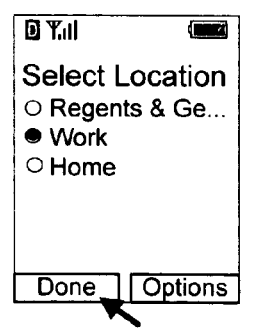
FIG. 8          FIG. 9          FIG. 10

SYSTEM AND METHOD FOR LOCATING A PHONE USER

FIELD OF THE INVENTION

The present invention generally relates to wired and wireless communication devices and more particularly relates to location enabled wired and wireless communication devices with location determination capabilities.

BACKGROUND OF THE INVENTION

Wireless communication devices typically include an address book for keeping track of contact information. Generally, this address book information includes the contact's name, phone number(s), email address, perhaps a street address, instant message address, and other types of information related to how to contact the person. A disadvantage of conventional address books in wireless communication devices is that the information they contain is static and must be updated by the user when the information changes.

Furthermore, some conventional wireless communication devices include an ability to determine their location. Such location information may be obtained through the network or via global positioning system modules integrated with the wireless communication device. This information, however, also remains static as the inherently mobile wireless communication device moves about. Accordingly, what is needed is a system and method that addresses these and/or other problems with the conventional systems.

SUMMARY OF THE INVENTION

Accordingly, described herein are systems and methods for locating a user of a target communication device, including wired and wireless devices, and allowing the target communication device to respond to a location request with its current location or a default location. The target communication device may also deny the location request.

According to one embodiment, a request for the location of a target wireless communication device is sent to the network where the request is responded to by the network or forwarded to the target device. When the request is received by the target device, the device can deny the location request or respond to the location request with the actual location of the device (as determined by GPS or the network) or with a default, predetermined location. The type of response (denial, actual location, or default location) can be selected by the user of the target device on a granular, per request basis so that the user of the target device can selectively respond to location requests in an appropriate fashion.

BRIEF DESCRIPTION OF THE DRAWINGS

FIGS. 3 through 7 are block diagrams illustrating an example sequence of screen shots on a wireless communication device for locating a mobile phone user according to an embodiment of the present invention.

FIGS. 8 through 10 are block diagrams illustrating an example sequence of screen shots on a wireless communication device for setting a locating for a mobile phone user according to an embodiment of the present invention.

DETAILED DESCRIPTION

Certain embodiments as disclosed herein include systems and methods for locating a user of a target wireless communication device and allowing the target wireless communication device to deny the location request or respond to the location request with its current location or a default location. For example, one method as disclosed herein allows for a request for the location of a target wireless communication device to be responded to by the network or by the target device. Advantageously, the target device may respond on a granular, per request basis so that the user of the target device can selectively deny or respond to location requests in an appropriate fashion.

After reading this description it will become apparent to one skilled in the art how to implement the invention in various embodiments and applications. However, although various embodiments of the present invention will be described herein, it is understood that these embodiments are presented by way of example only, and not limitation. As such, this detailed description of various embodiments should not be construed to limit the scope or breadth of the present invention as set forth in the appended claims.

Figure 1:
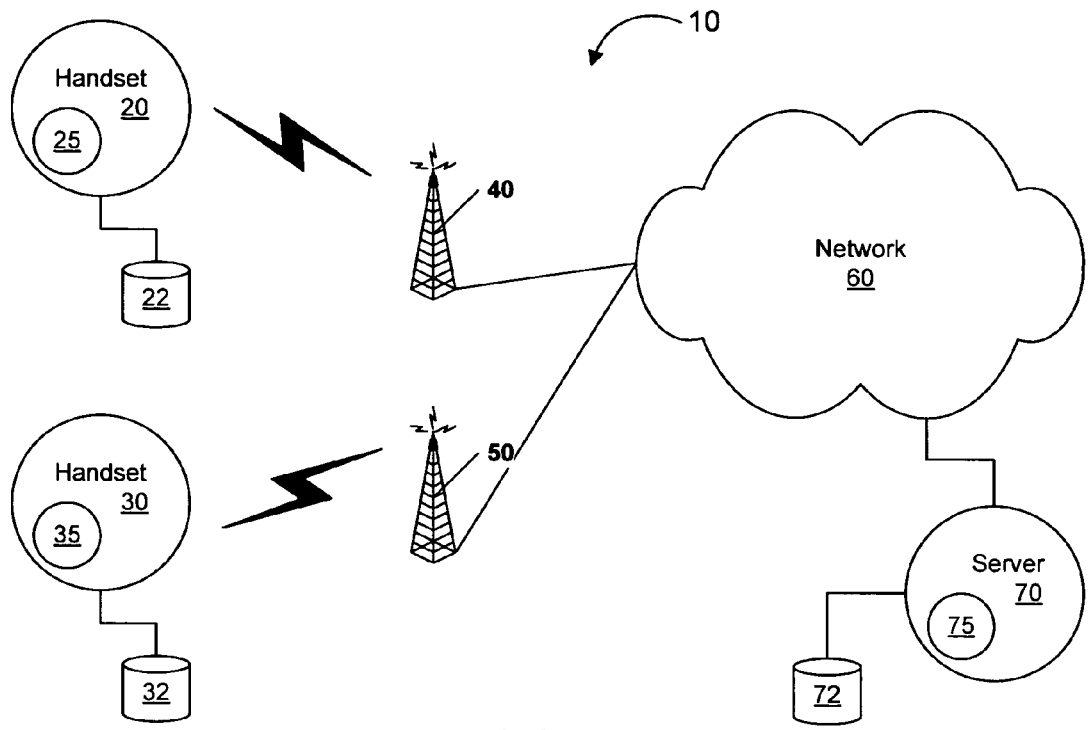
FIG. 1 is a high level network diagram illustrating an example system for locating a mobile phone user according to an embodiment of the present invention.

FIG. 1 is a high level network diagram illustrating an example system 10 for locating a mobile phone user according to an embodiment of the present invention. In the illustrated embodiment, the system 10 comprises a plurality of wireless communication devices (also referred to herein as handsets or mobile phones) such as handsets 20 and 30. The handsets 20 and 30 are communicatively coupled with one or more networks such as network 60 via one or more base stations such as base stations 40 and 50. The system 10 additionally comprises a location server 70 that is communicatively coupled with the handsets via the network 60.

The handsets 20 and 30 can be any of a variety of wireless communication devices. For example, handset 20 can be a cell phone, laptop computer, personal digital assistant, tablet computer, palmtop computer, or any other such device with the ability to communicate with the network 60 via a wireless connection. The handsets 20 and 30 are configured with a data storage area 22 and 32 respectively. The data storage areas 22 and 32 may be internal or external storage devices and may also be removable storage devices.

The handsets 20 and 30 are also configured with a location module 25 and 35, respectively. The location modules 25 and 35 may be implemented in hardware or software or some combination of the two. For example, the location module 25 may be a resident software application that is integrated with the controlling software (e.g., operating system) on the handset 20. In certain embodiments, the location module 25 may be an integrated circuit that is incorporated into the electronics of the handset 20. Additionally, the location module 25 may be an application specific integrated circuit that includes both hardware and software components.

The function of a location module such as location module 25 will be described more fully below. In general, however, the location module interacts with the user to receive and store operational preferences of the user. The location module also interacts with the network and perhaps a location server 70 to determine the location of the handset 20 and provide location information according to the operational preferences of the user.

In certain embodiments, the handsets 20 and 30 may also be wired communication devices that are directly connected to a communication network. For example, handset 20 may be a desktop (i.e., wired) phone in a business or residence.

The location server 70 is also equipped with a data storage area 72 that can also be internal, external or removable. The location server 70 may also have a location module 75 that is configured to track the location of various handsets such as handsets 20 and 30. The location module 75 may also perform the function of identifying the location of a handset using triangulation techniques in combination with information from base stations such as base stations 40 and 50. The location module 75 may also use global positioning system ("GPS") information from a handset to track the location of a handset.

The location server 70 and the location module 75 may also receive and route location requests to and from handsets and other devices (not shown) that are capable of communicating with the server 70 via the network 60 or any other network that the server 70 may be connected to. For example, the server 70 may also be connected to the Internet, through network 60 or otherwise, such that device capable of communicating with the server 70 via the Internet can request the location of handsets from the server 70.

Figure 2:
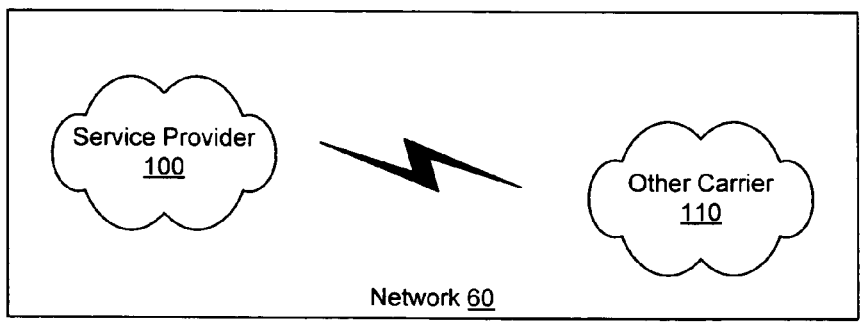
FIG. 2 is a block diagram illustrating an example network that is part of a system for locating a mobile phone user according to an embodiment of the present invention.

FIG. 2 is a block diagram illustrating an example network 60 that is part of a system for locating a mobile phone user according to an embodiment of the present invention. In the illustrated embodiment, the network 60 comprises a service provider network 100 and an other carrier network 110. Additional data or voice networks (not shown) may also be part of the network 60.

In one embodiment, handset 20 may request the location of handset 30 via network 60. Such a request may travel from the service provider network 100 that handset 20 is connected to and be passed over to the other carrier network 110 that handset 30 is connected to. The location response from handset 30 would in turn travel over other carrier network 110 and service provider network 100 to reach handset 20.

FIGS. 3 through 7 are block diagrams illustrating an example sequence of screen shots on a wireless communication device for locating a mobile phone user according to an embodiment of the present invention. Initially, in FIG. 3, a user selects a particular contact from the contact list in the handset and requests to see the "details" for that contact. Advantageously, all contact list entries in the handset include a LOCATION field that describes where the contact is (or more precisely, where the handset for the particular contact is).

In one embodiment, the LOCATION field may be initially blank or populated with default or more general location information such as a large city or metropolitan area. As shown in FIG. 4, the LOCATION field initially says that the location for the contact is San Diego. Next, as shown in FIG. 5, if the user selects the LOCATION field and chooses options, one option is to view the location of the contact. If the user elects to view the location, then as shown in FIG. 6A, a more granular text based description of the location for the contact is displayed. This more granular description may be acquired by the location module on the handset sending a location request to the network and receiving a response from the location server or directly from the target handset of the contact.

In certain embodiments, the contact record may not have a LOCATION field but rather the ADDRESS field may be used to dynamically provide the location for the contact. In another embodiment, the location for the contact may be dynamically obtained in real time and displayed to the user. For example, the user may request, through an "options" menu or other interface, the location for the contact. Upon receipt of the request, the handset may then request and display the current location for the contact.

In some cases, as shown in FIG. 6B, a more granular location may be provided in graphical format with the display of a portion of a map that identifies the location of the handset. The map image may be returned to the requesting handset in response to the location request. The map image that is returned may come from the location server on the network or from the target handset of the contact.

For example, a target handset may store a map image of its location and send the map image in response to a location request. In some cases, the map image may be stored on a location server and be sent as part of a response to a location request.

As shown in FIG. 7, the user of the requesting handset can save a location for a target handset. The location may be saved on the network (e.g., at a location server) or in the data storage area of the requesting handset. The location that is saved may be in text form or graphical form. Advantageously, a saved location may be used by the handset as a spoofed or alternate location as will be described in more detail below. In some cases, a saved location may be used to update the ADDRESS field in the contact record with text or graphical information.

FIGS. 8 through 10 are block diagrams illustrating an example sequence of screen shots on a wireless communication device for setting a locating for a mobile phone user according to an embodiment of the present invention. In one embodiment, the screen shots illustrate the interaction of a user with the location module on the handset. The location module allows the user to set operational preferences such as whether to allow location requests, whether the network (e.g., location server) should response to location requests on behalf of the handset, whether the actual location should be provided in response to locations requests or whether a default location for the handset (regardless of the actual location).

For example, FIG. 8 shows an example screen shot for setting the location permissions on the handset. The user has the option of allowing all location requests or denying all location requests. Additionally, the user has the option of allowing location requests received from requesters that have a contact entry in the contacts list of the handset. The user also has the option of being prompted in real time for a decision of whether to allow or deny the request. Other options can also be made available to the user of the handset, for example allowing requests by area code or by selective identification based on groups in the contact list. Other options can also be employed as will be understood by those having skill in the art having the benefit of this disclosure.

FIG. 9 shows an example screen shot for setting the operational parameters regarding the type of location information that is provided in response to a location request. In the illustrated embodiment, the user can select to provide the actual location of the handset, as determined, for example by GPS or triangulation. The user also has the ability to select that an alternate or spoofed or default location be sent in response to a location request. For example a user may select to have all responses to location requests send the users work location (in text or graphical format) in response through whether the user is actually at that location or not. Moreover, the user has the option of having the network respond to location requests.

For example, the handset may be periodically obtaining GPS information from a GPS module on the handset and then providing that information to the network where it is tracked by a location server. If the user selects to have the network respond to location requests, then the handset may not even receive the location request and instead the network location server receives the request and responds to the request with the location information (text or graphical) based on the GPS information being periodically provided to the network. This same process may also be used in triangulation or other techniques used by the handset or network to identify the location of the handset.

FIG. 10 shows an example screen shot for setting the operational parameter of an alternate location that should be reported in response to location requests. Advantageously, saved locations can be selected as an alternate location and the text or graphical location information stored on the handset or network is then provided in response to location requests.

Figure 11:
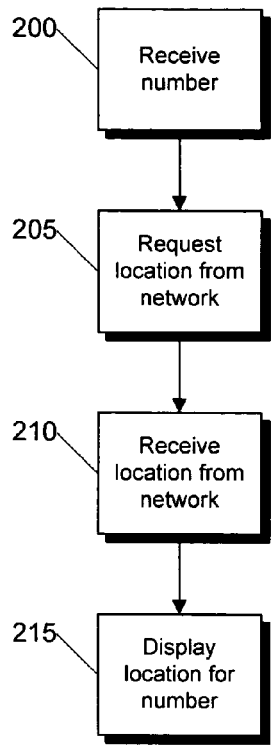
FIG. 11 is a flow diagram illustrating an example process for locating a mobile phone user according to an embodiment of the present invention.

FIG. 11 is a flow diagram illustrating an example process for locating a mobile phone user according to an embodiment of the present invention. Initially, in step 200 the handset receives a number for the mobile phone (target handset) that is to be located. The number may be received through direct entry (e.g., by a user typing in the number on the keypad of the handset) or by indirect entry (e.g., received via SMS, email, instant message, or other). Additionally, the number may be received via selection of a particular contact in the contacts list.

Next, in step 205 the handset requests the location of the target handset from the network. The request may be sent to a location server on the network or may be routed directly to the target handset by the network. In one embodiment, this routing may be determined by operational parameters that are set on the target handset. In some cases, the network may establish the routing procedure.

After requesting the location from the network, the handset, in step 210, receives a response from the network that includes the location of the target handset. The location is then displayed, as shown in step 215. The display of the location can be integrated with a display of other contact information for the target handset.

In one embodiment, when contact information is first requested such as shown in FIG. 3, the handset may request macro or general location information from the network. For example, if the LOCATION field is not populated when the user requests contact information, the handset may use the process outlined in FIG. 11 to obtain general location information. This information may be provided by the network based on the last known location for the target handset, which may be, for example, determined by the location of the base station with which the target handset was last in contact. In this way, a general location such as a city or state may be initially provided to provide the LOCATION field for display of the contact information.

Figure 12:
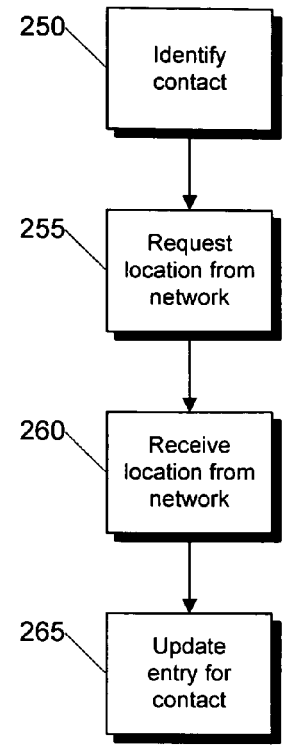
FIG. 12 is a flow diagram illustrating an example process for periodic real time updating of the location of a mobile phone user according to an embodiment of the present invention.

FIG. 12 is a flow diagram illustrating an example process for periodic real time updating of the location of a mobile phone user according to an embodiment of the present invention. Initially, in step 250, the contact entry for real-time updating is identified. In one embodiment, the identification may be provided by the user interacting with the location module through the contact list or settings menus such as those described with respect to FIGS. 3 through 10. Alternatively, or in combination, the location module can cycle through a list of contacts that are flagged for real time updating and identify each contact that needs to be updated.

Next, in step 255 the handset requests the location of the target handset from the network and receives the location information in step 260. Upon receiving the location information, the LOCATION field in the contact entry is updated. This process can also be used in combination with the process described with respect to FIG. 11. In such an embodiment, for example, the initial general location may be provided by use of the real time updating and then when the user requests more detailed location information, a request for the more detailed location information can be sent to the network.

Figure 13:
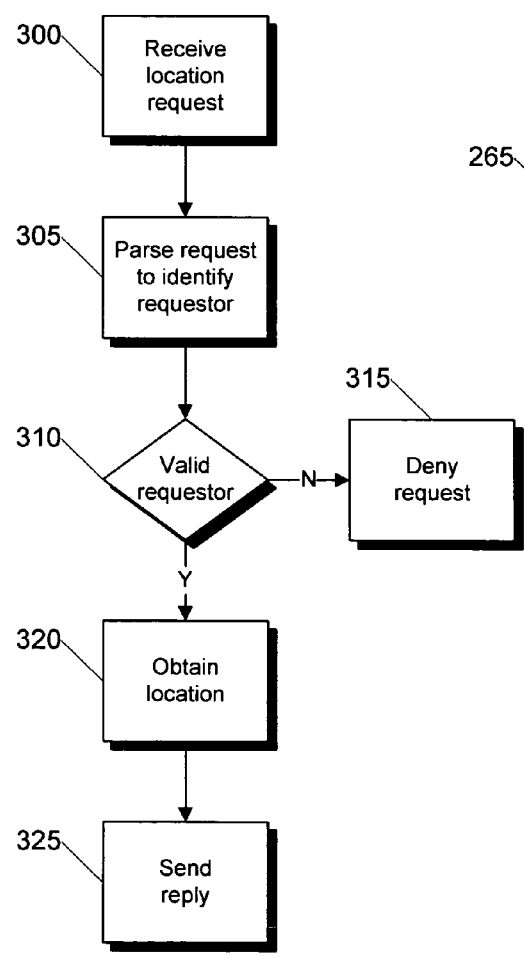
FIG. 13 is a flow diagram illustrating an example process for responding to a request for the location of a mobile phone user according to an embodiment of the present invention.

FIG. 13 is a flow diagram illustrating an example process for responding to a request for the location of a target handset according to an embodiment of the present invention. Initially, in step 300, the target handset receives the location request. Next, in step 305 the target handset parses the request to identify the requesting handset. For example, the target handset may parse the request to identify the mobile identification number ("MIN") of the requesting handset. In one embodiment, the MIN may be the telephone number of the requesting handset.

Next, in step 310, the target handset determines if the identified requesting handset is valid. For example, in one embodiment, only those requesting handsets with entries in the contact list of the target handset are valid, as previously explained with respect to the permissions settings in FIG. 8. If the requesting handset is not valid, as determined in step 310, then the target handset denies the request, as shown in step 315. If the requesting handset is valid, as determined in step 310, then the target handset obtains its location, as illustrated in step 320.

In one embodiment, the target handset may obtain its location from the network by a separate request, for example, or the target handset may obtain its location via an integral GPS module, or some combination of network and integral services and modules. In some cases, the target handset may obtain its location from memory on the handset, for example when the user of the target handset has selected that a default location be provided in response to location requests, notwithstanding the actual location of the handset. Once the location has been obtained, the location information is sent in reply to the location request, as shown in step 325.

Figure 14:
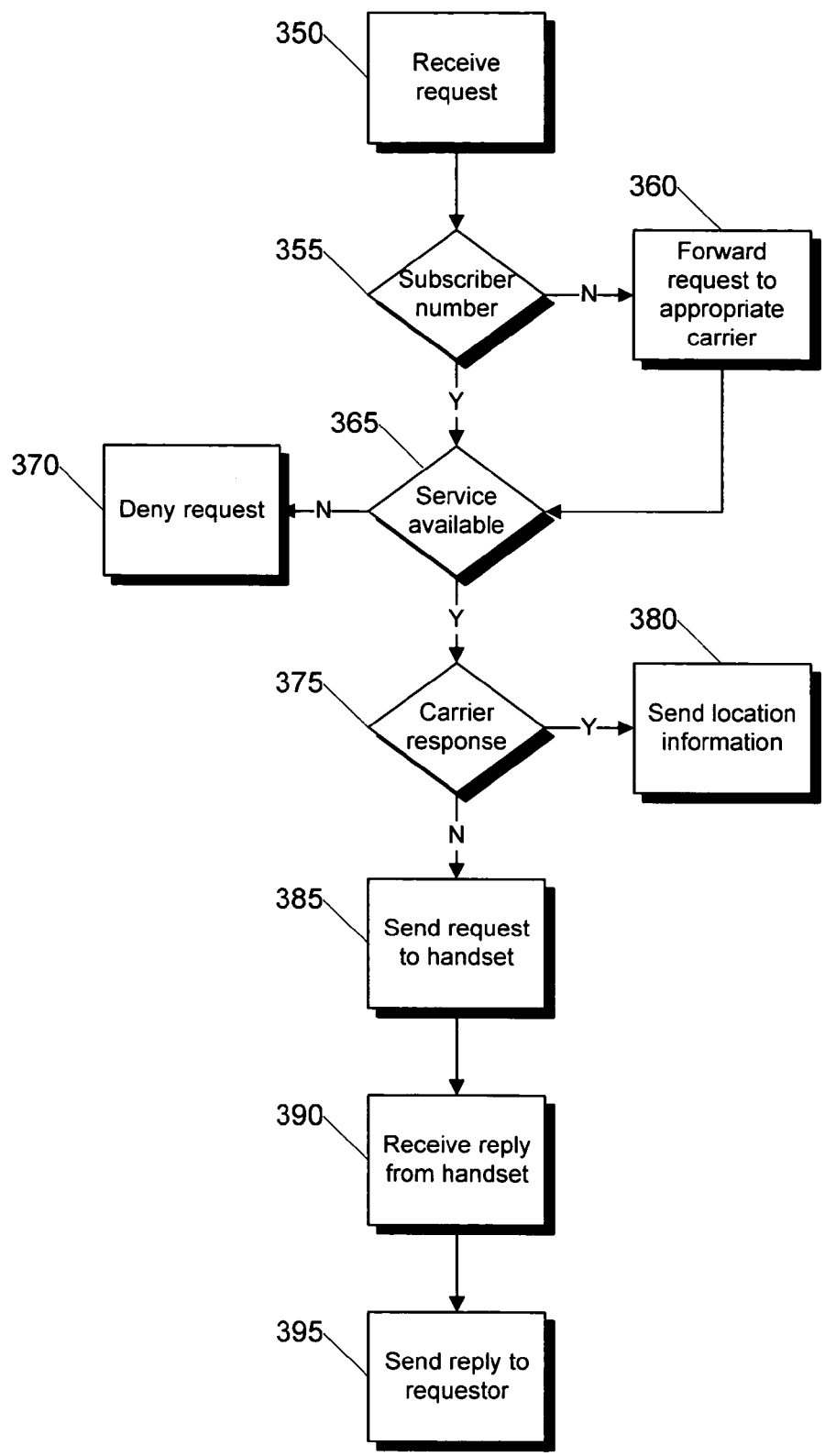
FIG. 14 is a flow diagram illustrating an example process for locating a mobile phone user according to an embodiment of the present invention.

FIG. 14 is a flow diagram illustrating an example process for locating a target handset according to an embodiment of the present invention. Initially, in step 350 the network receives a location request from a requesting handset. In one embodiment, a location server such as that described in FIG. 1 on the network may receive and process the location request. Upon receipt of the location request the network determines, in step 355, if the number for the target handset is a subscriber number on the carrier's network. If the number is not that of a subscriber, then the network determines the appropriate carrier for the requested number and forwards the location request to that network, as shown in step 360.

If the number is a subscriber or if a different carrier network processes the request (e.g., via step 360), in step 360 the network determines if the location service is available for the particular handset for which the location has been requested. If the service is not available, then in step 370 the request is denied. If the service is available, the network determines, in step 375, if the network is authorized to respond to the request on behalf of the handset. For example, in an embodiment where the target handset is a wired device, the location of the device may be configured by the user when the device was initially setup or periodically thereafter. If the network is authorized to respond to the request on behalf of the handset, then in step 380 the network sends the location information. For example, the network may send the general location information in response to a general location request or the network may send a specific location in response to a specific location request. The response may also be text based or may include a graphical component such as a map of the general or specific location of the target handset.

If the network is not authorized to respond on behalf of the target handset, as determined in step 375, then the network sends the location request to the target handset in step 385. The target handset may then process the request, for example as previously described with respect to FIG. 13, and then in step 390 the network receives a response from the target handset. Next, in step 395, the network sends a reply to the requesting handset. In one embodiment, the reply sent by the network to the requesting handset may include information received from the target handset and also additional information. For example, the target handset may respond with a default location that includes graphical map data (e.g., a JPEG image) that is stored on a location server on the network. Accordingly, the response from the network to the requesting handset can include both the default location information received from the target handset and the corresponding map image stored on the location server.

Figure 15:
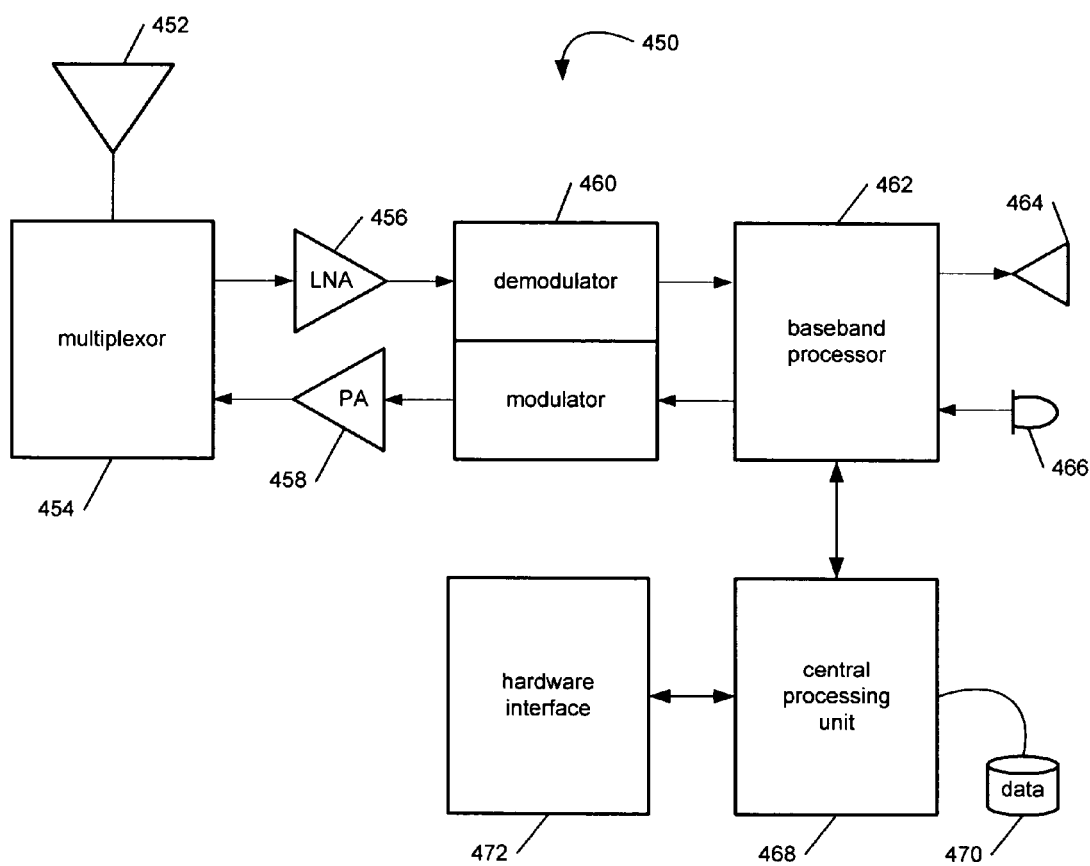
FIG. 15 is a block diagram illustrating an exemplary wireless communication device that may be used in connection with the various embodiments described herein.

FIG. 15 is a block diagram illustrating an exemplary wireless communication device 450 that may be used in connection with the various embodiments described herein. For example, the wireless communication device 450 may be used in conjunction with a handset as described above with respect to FIG. 1. However, other wireless communication devices and/or architectures may also be used, as will be clear to those skilled in the art having the benefit of this disclosure.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the wireless communication device 450, radio frequency ("RF") signals are transmitted and received by antenna 452. Multiplexor 454 acts as a switch, coupling antenna 452 between transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described.

For example, data storage area 470 may include a location module (not shown) that integrates with the operating system or module that controls the operation of the contact list. Accordingly, the location module may extend the functionality of the contact list to include the LOCATION field and the ability for a user to set the operational parameter preferences. Additionally, the location module is configured to respond to location requests in accordance with the operational parameter preferences that have been set by the user.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative ; the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Figure 16:
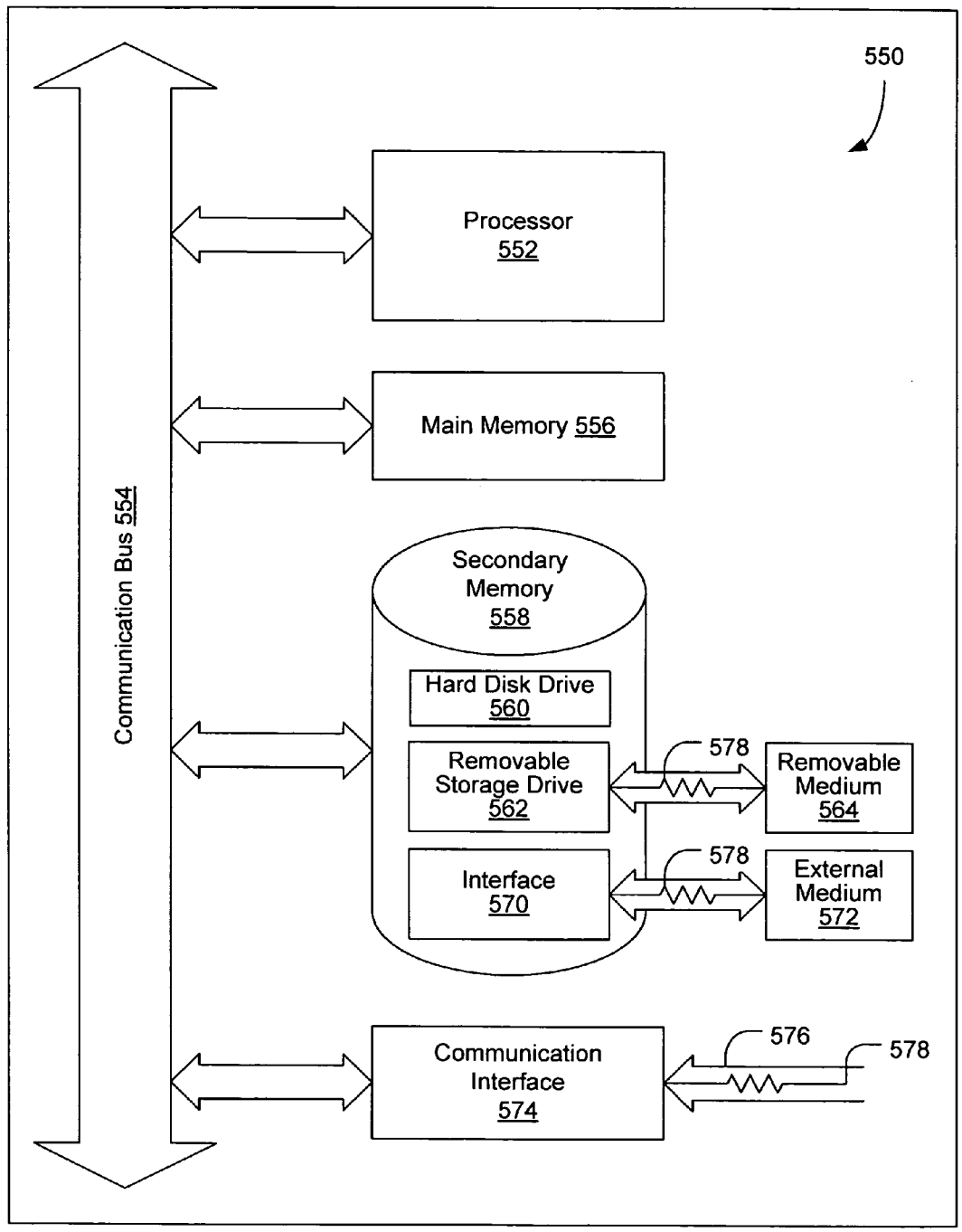
FIG. 16 is a block diagram illustrating an exemplary computer system that may be used in connection with the various embodiments described herein.

FIG. 16 is a block diagram illustrating an exemplary computer system 550 that may be used in connection with the various embodiments described herein. For example, the computer system 550 may be used in conjunction with a location server as previously described with respect to FIG. 1. However, other computer systems and/or architectures may be used, as will be clear to those skilled in the art having the benefit of this disclosure.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/ point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A computer implemented method for identifying the location of a user of a target communication device from a requesting communication device, the method comprising:

receiving at the requesting communication device a selection of the target communication device, the selection representing a contact record associated with the target communication device in an address book on the requesting communication device;

sending, using the requesting communication device, a location request comprising a category for a unique identifier for the target communication device;

receiving, at the target communication device, a designation of whether an actual location of the target communication device or an alternative location of the target communication device is to be delivered to the requesting communication device;

obtaining, at the requesting communication device, location information for the target communication device responsive to the location request, wherein:

the actual location of the target communication device is obtained when the designation received at the target communication device indicates that an actual location is to be delivered to the requesting device;

the alternate location of the target communication device is obtained when the designation received at the target communication device indicates that an alternate location is to be delivered to the requesting device;

enabling the actual location of the target communication device or the alternate location of the target communication device to be predefined prior to the obtaining by the user of the target communication device based on at least one of a unique identifier of the requesting communication device and a contact list group membership of the requesting communication device, where the alternate location is a location that is different from the actual location of the target communication device; and displaying the location information on the requesting communication device.

2. The method of claim 1, wherein the location request is sent to a location server on a communication network.

3. The method of claim 1, wherein displaying the location information further comprises displaying an address of the location information.

4. The method of claim 1, wherein displaying the location information further comprises displaying an image of the location information.

5. The method of claim 4, wherein the displayed image is an image of a map.

6. The method of claim 1, further comprising saving the location information to persistent memory in the requesting communication device.

7. A computer implemented method for responding to a request for the location of a user of a target wireless communication device from a requesting wireless communication device, the method comprising:

receiving at the target wireless communication device the request for the location of the target wireless communication device from the requesting wireless communication device, where the request is a selection representing a contact record associated with the target wireless communication device in an address book on the requesting wireless communication device;

receiving, at the target communication device, a designation of whether an actual location of the target communication device or an alternative location of the target communication device is to be delivered to the requesting communication device;

obtaining, at the requesting communication device, location information for the target communication device responsive to the location request, wherein:

the actual location of the target communication device is obtained when the designation received at the target communication device indicates that an actual location is to be delivered to the requesting device;

the alternate location of the target communication device is obtained when the designation received at the target communication device indicates that an alternate location is to be delivered to the requesting device;

parsing the request to obtain a unique identifier for the requesting wireless communication device;

determining a category for the unique identifier of the requesting wireless communication device; and responding to the request with one of a denial of the request for the location of the target wireless communication device, an actual location of the target wireless communication device, and an alternate location of the target wireless communication device, whereby the user of the target communication device identifies in advance of responding the alternate location irrespective of whether the denial of the request, the actual location or the alternate location is obtained by the requesting wireless communication device, whether the responding to the request represents the denial of the request, the actual location of the target wireless communication device, or the alternate location of the target wireless communication device is predefined prior to the determining by the user of the target wireless communication device based on at least one of the category for the unique identifier of the requesting wireless communication device and a contact list group membership of the requesting wireless communication device, where the alternate location is different from the actual location.

8. The method of claim 7, further comprising updating the actual location prior to responding to the request with the actual location.

9. The method of claim 7, further comprising selecting a predetermined location prior to responding to the request with the alternate location.

10. The method of claim 7, wherein the response provides a location using text.

11. The method of claim 7, wherein the response provides a location using a graphical image.

12. A requesting wireless communication device comprising:

a contact list comprising a plurality of contact records, each contact record having a location field configured to store a location for a wireless communication device associated with the respective contact record;

a location module configured to construct a location request seeking location information for a target wireless communication device associated with a particular contact record, send the location request over a wireless communication network, and update the location field for the particular contact record upon receiving a response to the location request;

a designation, received at the target communication wireless communication device, of whether an actual location of the target communication device or an alternative location of the target communication device is to be delivered to the requesting communication device;

the actual location of the target communication device is obtained when the designation received at the target communication device indicates that an actual location is to be delivered to the requesting device;

the alternate location of the target communication device is obtained when the designation received at the target communication device indicates that an alternate location is to be delivered to the requesting device;

wherein the location module is further configured to receive the location request, parse the location request to obtain a unique identifier for the wireless communication device, determine whether to deny the location request or respond to the location request, obtain one of current location information and an alternate location information to include in the response to the location request, and respond to the location request with one of the current location information, the alternate location information and deny the location request, whereby the user of the target wireless communication device identifies in advance of responding the alternate location information irrespective of whether the current location information or the alternate location information is obtained by the wireless communication device, whether the response to the location request represents the current location information, the alternate location information or deny the location request is predefined prior to the obtaining based on at least one of the unique identifier of the wireless communication device and the contact list group membership of the wireless communication device, where the alternate location information is different from the current location information.

13. The device of claim 12, wherein the location field stores a location in text format.

14. The device of claim 12, wherein the location field stores a location in graphical format.

15. The device of claim 12, further comprising operational parameters stored in memory that determine whether to deny the location request or respond to the location request.

16. A method for identifying the location of a user of a target communication device, the method comprising:
   receiving with a requesting communication device a selection of the target communication device, the selection representing a contact record associated with the target communication device in an address book on the requesting communication device;
   sending, using the requesting communication device, a location request comprising a category for a unique identifier for the target communication device;
   receiving, at the target communication device, a designation of whether an actual location of the target communication device or an alternative location of the target communication device is to be delivered to the requesting communication device;
   obtaining, at the requesting communication device, location information for the target communication device responsive to the location request, wherein:
      the actual location of the target communication device is obtained when the designation received at the target communication device indicates that an actual location is to be delivered to the requesting device;
      the alternate location of the target communication device is obtained when the designation received at the target communication device indicates that an alternate location is to be delivered to the requesting device; and
   displaying the location information on the requesting communication device.

17. The method of claim 16, further comprising receiving, at the target communication device, an operational preference indication that no response to a location request is to be provided, wherein no location of the target communication device is obtained when the operational preference indication is received.

18. The method of claim 16, wherein the alternate location is a default location specified using the target communication device.

19. The method of claim 16, wherein the location request is sent to a location server on a communication network.

20. The method of claim 19, further comprising receiving, at the target communication device, a designation of whether the location server is to provide a response to a location request in lieu of the target communication device.

21. The method of claim 20, wherein the alternative location is provided by the server based on the last known location of the target handset.

* * * * *